United States Patent [19]
Little et al.

[11] Patent Number: 5,724,832
[45] Date of Patent: Mar. 10, 1998

[54] SELF-CLEANING CRYOGENIC REFRIGERATION SYSTEM

[75] Inventors: William A. Little, Palo Alto; Igor Sapozhnikov, San Jose, both of Calif.

[73] Assignee: MMR Technologies, Inc., Mountain View, Calif.

[21] Appl. No.: 710,508

[22] Filed: Sep. 18, 1996

Related U.S. Application Data

[63] Continuation-in-part of Ser. No. 412,529, Mar. 29, 1995, Pat. No. 5,617,739.
[51] Int. Cl.⁶ .......................................................... F25J 1/00
[52] U.S. Cl. ............................. 62/613; 62/114; 62/48.2
[58] Field of Search ............................. 62/114, 48.2, 613

[56] References Cited

U.S. PATENT DOCUMENTS

| | | | |
|---|---|---|---|
| 3,266,262 | 8/1966 | Moragne | 62/48.2 |
| 4,781,738 | 11/1988 | Fujiwara et al. | 62/114 |
| 5,337,572 | 8/1994 | Longsworth | 62/114 |

Primary Examiner—Ronald C. Capossela
Attorney, Agent, or Firm—Lumen Intellectual Property Services

[57] ABSTRACT

A method and device is disclosed for removing residual oil and other contaminants from the refrigerant stream flowing to low-temperature stages of a cryogenic refrigerator. A stream of vapor and liquid refrigerant is injected into a cyclone chamber [32] through the inlet tube [34]. While the liquid drains down a conical section [36] and out through a liquid line [38], the vapor phase moves up into a packing of metal platelets [42] which is, in a particular embodiment, cooled by a returning stream of cold vapor passing through a tube [48] wrapped around the column. A portion of the vapor condenses on the platelets and is maintained in equilibrium with the vapor. Since high-molecular-weight contaminants are more soluble in the liquid phase, they are carried down the column with the drops of condensate and are swept out with the liquid fraction through the liquid line [38]. Consequently, the vapor sent out a vapor line [46] and into the low-temperature stages of the refrigeration system is cleansed of all oil residues and contaminants. A low-temperature refrigeration system with such a device can be operated continuously for many months with no signs of clogging. Moreover, the fractionating column is inexpensive, contains no moving parts, and does not add significant volume to the system.

23 Claims, 11 Drawing Sheets

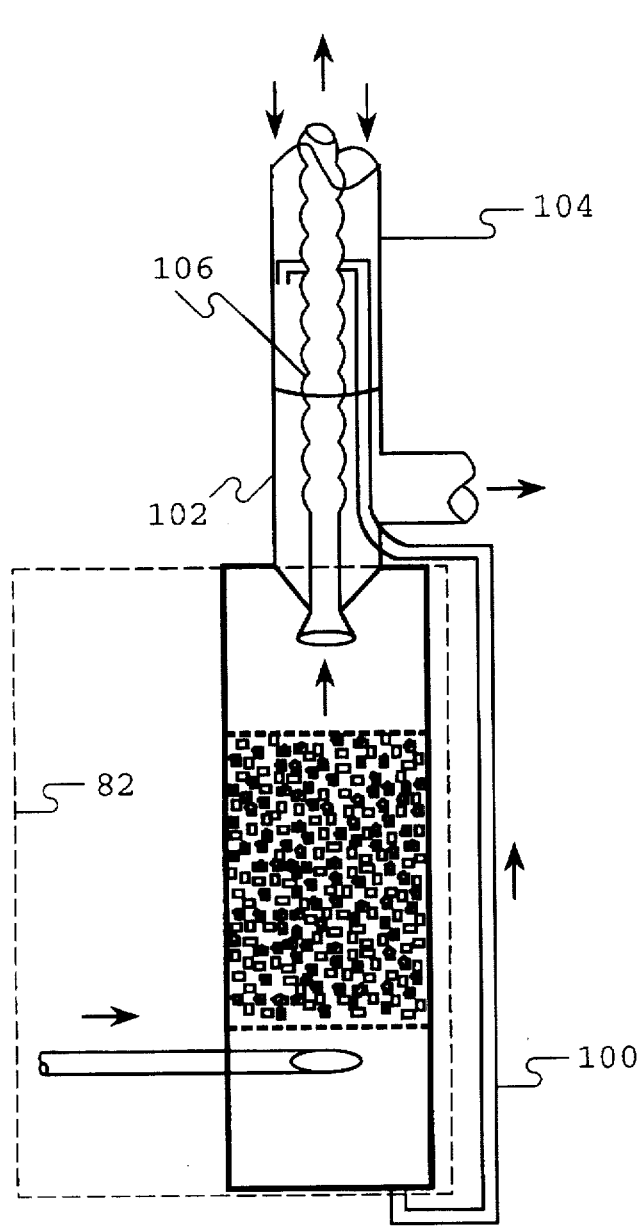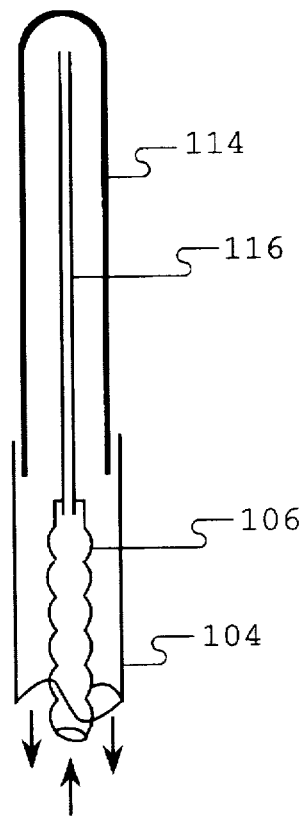
Figure 7a
Figure 7b

1

SELF-CLEANING CRYOGENIC REFRIGERATION SYSTEM

RELATED APPLICATIONS

This application is a continuation-in-part of patent application Ser. No. 08/412,529 filed Mar. 29, 1995, now U.S. Pat. No. 5,617,739 which is hereby incorporated by reference.

This invention was reduced to practice with Government support under the Department of Navy Contract N00014-94-C-2164, awarded by the Naval Research Laboratory, Washington. The Government has certain rights in the invention.

FIELD OF THE INVENTION

This invention relates to closed-cycle, cryogenic refrigeration systems using multi-component mixed-gas refrigerants and oil-lubricated compressors. In particular, it relates to devices and methods for separating oil and other contaminants from the working fluids in such systems.

BACKGROUND OF THE INVENTION

Refrigeration systems for attaining temperatures down to about −40° C., such as those used in domestic refrigerators and freezers, operate on the vapor-compression cycle. In the first step of this cycle, a low-pressure refrigerant vapor is compressed by a simple oil-lubricated compressor, such as a rotary vane or piston compressor. The warm compressed vapor then enters an air-cooled condenser where it loses heat and condenses. The condensed liquid refrigerant, with some entrained oil dissolved in it, passes through a fine capillary tube, throttle, or restriction into a larger chamber at a lower pressure, where it evaporates and absorbs heat. The low-pressure refrigerant vapor and the oil are then returned to the intake of the compressor, closing the cycle.

Lower temperatures, down to the −50° C. to −100° C. range, can be achieved by cascading two vapor-compression cycle refrigeration systems. The first system refrigerates down to the −10° C. to −40° C. range as described above, while the second system refrigerates further down to the −50° C. to −100° C. range using a low-boiling-point refrigerant. In order to operate such cascade refrigerators continuously, the concentration of oil in the low-boiling-point refrigerant must be kept low enough so that it remains in solution and does not clog the low-temperature capillary, blocking the refrigerant flow. Although it is possible to attain temperatures below −100° C. using these techniques, such cascaded refrigeration systems have clogging problems at these lower temperatures. Moreover, one must either use additional refrigeration circuits or higher pressure compressors, both of which add cost and complexity to the refrigerator.

Temperatures down into the −100° C. to −200° C. range also have been achieved using a single refrigerant stream with a mixture of several refrigerants having different boiling points. In this method of refrigeration, a simple compressor pressurizes the refrigerant mixture, some portion of which condenses when cooled to ambient temperature by an air-cooled condenser. The liquid portion is then separated from the vapor portion in a liquid-vapor separator and allowed to expand through a capillary, causing it to evaporate and cool. The evaporated liquid passes through a heat-exchanger where it cools the vapor coming from the separator, and then flows back to the compressor. Meanwhile, as the vapor coming from the separator is cooled in the heat-exchanger, a portion of it condenses. This condensed portion is then separated from the remaining vapor portion, evaporated, and used to cool the remaining vapor portion further, just as before. Several such stages of liquid-vapor separation and counter-current heat exchange are used to reach the lowest refrigeration temperature.

In this type of refrigeration system, oil from the compressor is largely concentrated in the liquid fraction of the first liquid-vapor separator and returned to the compressor via the first counter-current heat exchanger. Likewise, the higher-boiling-point components of the mixture are successively removed from the refrigerant stream as it proceeds through the stages to the lowest temperature stage, thus removing these components from the stream before they can freeze in the lower temperature capillaries and clog the system. This refrigeration method, however, does not provide an effective means for purging the refrigerant stream of all high-molecular-weight contaminants that can clog the flow at low temperatures. Moreover, the phase separators add cost and complexity to the refrigeration system.

The principles of these single-stream mixed-refrigerant systems were first described by A. P. Kleemenko, "One Flow Cascade Cycle", Proceedings of the Xth International Congress on Refrigeration, Copenhagen, 1, 34–39 (1959), Pergamon Press, London. They have subsequently been described in texts of cryogenic refrigeration systems, such as "Theory and Design of Cryogenic Systems" by A. Arkjarov, I. Marfenina and Ye. Mikulin, Mir Publishers, Moscow (1981). An important improvement in the cycle was described by D. J. Missimer in U.S. Pat. No. 3,768,273 issued in 1973. Missimer obtained more stable and lower pressure operation by making only a partial liquid-vapor separation at each stage rather than a complete separation. Nevertheless, Missimer's improvement on this type of refrigeration system still has low temperature clogging problems due to high-molecular-weight contaminants in the refrigerant stream, and still requires the use of several phase separators.

Other authors have described the use of mixed-gas refrigerants to attain low temperatures without the use of expensive phase separators. Most notable are those refrigerant mixtures containing a mixture of nitrogen with some of the lighter hydrocarbon gases, such as methane, ethane, propane, and isobutane. Similar mixtures containing, in addition, some of the Freons have been described by Alfeev, Brodyansky, Yagodin, Nikolsky & Ivantsov, British Patent 1,336,892 (1973); W. A. Little, Proceedings of the 5th Cryocooler Conference, Monterey (1988); W. A. Little, Advances in Cryogenic Engineering, 1305–1314 (1990); C. K. Chan, Proceedings of Interagency Cryocooler Meeting on Cryocoolers, p. 121 (1988), and R. Longsworth, U.S. Pat. No. 5,337,572 (1994).

As Chan and Little have noted, although a refrigeration system using these refrigerant mixtures can attain low temperatures without using phase separators, experience has shown that prolonged refrigeration at these temperatures can only be achieved if the gas stream is cleansed of condensable contaminants. Present methods for cleaning the working fluid of oil residues, contaminants, and water vapor involve introducing filters (e.g., a molecular sieve or a series of activated charcoal adsorption filters) into the high-pressure line or pressure-swing dual-adsorption columns. These filters, however, are expensive and add complexity to the system. Moreover, they add substantially to the volume of the refrigeration system, resulting in refrigeration systems that are large, bulky, and have start-up problems.

Contaminants that can cause clogging of the capillaries or expansion valves are of two general classes. The first class of contaminants includes the residual oil that remains in the stream after it passes through the oil separator. This residual oil can precipitate out of the refrigerant solution at the lowest temperatures and cause clogging. The second class of contaminants includes the products from reactions between the oil and the refrigerants, as well as high-molecular-weight residues extracted over time from various sources in the compressor such as the wire insulation, the lubricant used for winding the wire, plastic insulation, castings, the oil, and the case of the compressor. Although a simple cyclone oil separator can remove much of the entrained oil from the hot vapor coming from the compressor, it is ineffective in removing the more complex residues in the second class of contaminants.

OBJECTS AND ADVANTAGES OF THE INVENTION

In view of the above, it is a primary object of the present invention to provide a simple and inexpensive refrigeration system that can be continuously operated at low temperatures without clogging. It is also an object of the invention to provide a means by which the working fluid of a mixed-refrigerant cryocooler can be continuously purged of both high and low molecular weight contaminants. It is a further object of the invention to provide such means which is simple, inexpensive, contains no moving parts and does not add significant volume to the refrigerating system. Further objects and advantages will become apparent from the following description and drawings.

SUMMARY OF THE INVENTION

The present invention includes a novel method of separating residual contaminants from a refrigerant stream. It is based upon the fact that the contaminants are generally more soluble in the liquid fraction than in the vapor fraction. In order for this fact to be effectively applied to separation, however, the liquid and vapor fractions must be kept close to equilibrium with one another so that an effective partition between the two phases can occur. The present invention achieves this equilibrium by using a miniature fractionating column containing a packing which presents a large surface area to the vapor. This column is inserted in the high-pressure line from the compressor before or after the air-cooled cooled condenser and is cooled by a returning flow of low-pressure vapor or by other means described below. As the vapor flows upward through the column, a condensate forms on these cooled platelets and washes down through the column. Consequently, the residual contaminants, which are more soluble in the liquid condensate than in the vapor, are separated from the vapor fraction, and collected in the bottom of the column. The condensate in the bottom of the column is then available to provide additional cooling within the system. The details of this process will become clear from the cooling system described below.

DESCRIPTION OF THE DRAWINGS

FIG. 7a is a cross-sectional view of a lower portion of an embodiment of the invention in the form of a cold-finger refrigerator system with a cooling system for a fractionating column.

FIG. 7b is a cross-sectional view of an upper portion of an embodiment of the invention in the form of a cold-finger refrigerator system with a cooling system for a fractionating column.

DETAILED DESCRIPTION

Figure 1:
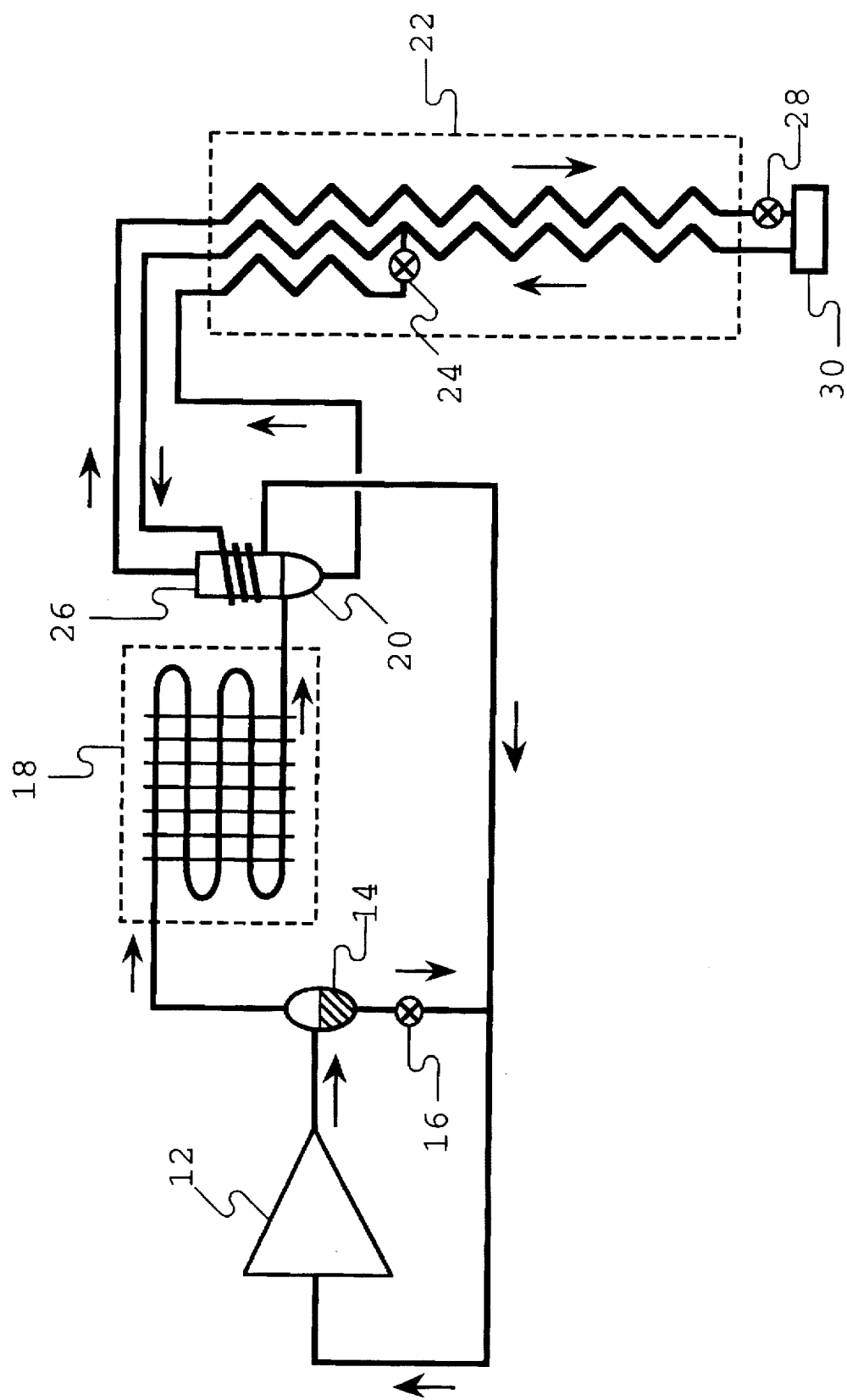
FIG. 1 is a schematic representation of a self-cleaning refrigeration system according to the first preferred embodiment of the invention.
Figure 2:
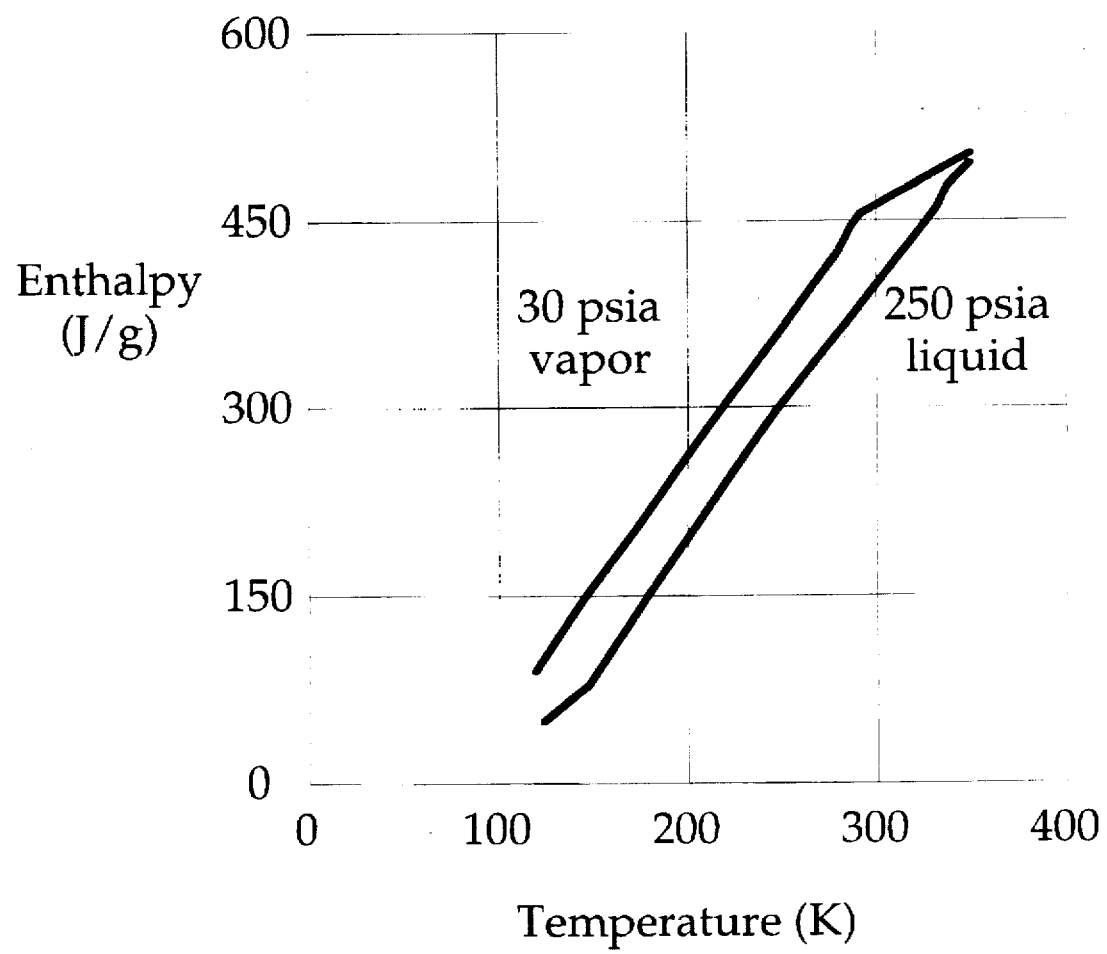
FIG. 2 is an H Vs. T graph for an eight component refrigerant mixture according to the first preferred embodiment of the invention.

A preferred embodiment of the invention is shown in FIG. 1. Circulating through the system is a refrigerant mixture composed of 8% propane, 8% n-butane, 12% argon, 7% nitrogen, 18.5% R14, 14.5% R134a, 17.5% R23, and 14.5% R123. FIG. 2 shows an H vs. T (enthalpy per unit mass vs. temperature) graph for this mixture. The lower curve corresponds to a high-pressure liquid stream as it flows along the length of a heat exchanger 22, while the upper curve corresponds to a low-pressure vapor stream. As the figure suggests, this mixture is an appropriate choice for a low-temperature refrigerant. Other refrigerant mixtures of different composition can also be used, such as the mixtures described by Missimer, Alfeev et al, Longsworth, Little and others. A simple oil-lubricated compressor 12 compresses a low-pressure returning stream of the mixture to a pressure of about 17 bar. This compressor can be, for example, a conventional piston or rotary vane compressor. The preferred embodiment uses a Danfoss FF8.5GX compressor with a displacement of 8 cc's, operating at 60 Hz (3450 rpm), drawing approximately 300 W input power, fully oil-lubricated with a 400 cc's charge of Polyolester oil.

The refrigerant mixture emerges from the compressor 12 as a hot vapor with about 2% entrained oil from the compressor contained in it as fine droplets. The mixture then enters a cyclone oil separator 14, where the droplets are thrown against the wall of the separator, coalesce, and flow back to the compressor via a fine capillary 16. All references to capillaries in this description and the following claims encompass equivalent devices such as throttles, restrictions or others known in the field of refrigeration. Meanwhile, the hot vapor, cleansed of most of the oil, leaves through the top of the separator 14. It then enters an air-cooled condenser 18 where a portion of the vapor liquefies. The liquid and vapor fractions of the resulting refrigerant stream are then separated in a cyclone liquid-vapor separator 20.

The liquid fraction of the refrigerant flows through the bottom of the separator and into the top of a counter-current heat exchanger 22 where it is pre-cooled by a stream of cold vapor returning from the low-temperature portion of the system. This pre-cooled liquid, which is at high pressure, then passes through an expansion capillary 24, causing it to evaporate and cool further. The evaporated liquid then joins the returning cold vapor stream part-way through the heat-exchanger 22. After this stream of cold vapor exits the top of the heat-exchanger 22, it flows through a tube coiled around and bonded to the outside of a fractionating column or fractionator 26 where it cools the top half of the column. Finally, this cool vapor stream returns to the low-pressure side of the compressor where it repeats the cycle.

Meanwhile, the high-pressure vapor fraction of the refrigerant in the liquid-vapor separator 20 rises up through the cooled fractionating column 26 and flows into the heat-exchanger 22 where it progressively cools and condenses as it flows down the heat-exchanger. The high-pressure liquid then expands through a capillary 28, cooling further as it evaporates. Now at the lowest temperature stage, the resulting cold vapor stream absorbs heat from a cold plate 30 which is used, for example, to cool a load inside a thermally insulated container or dewar (not shown).

Figure 3:
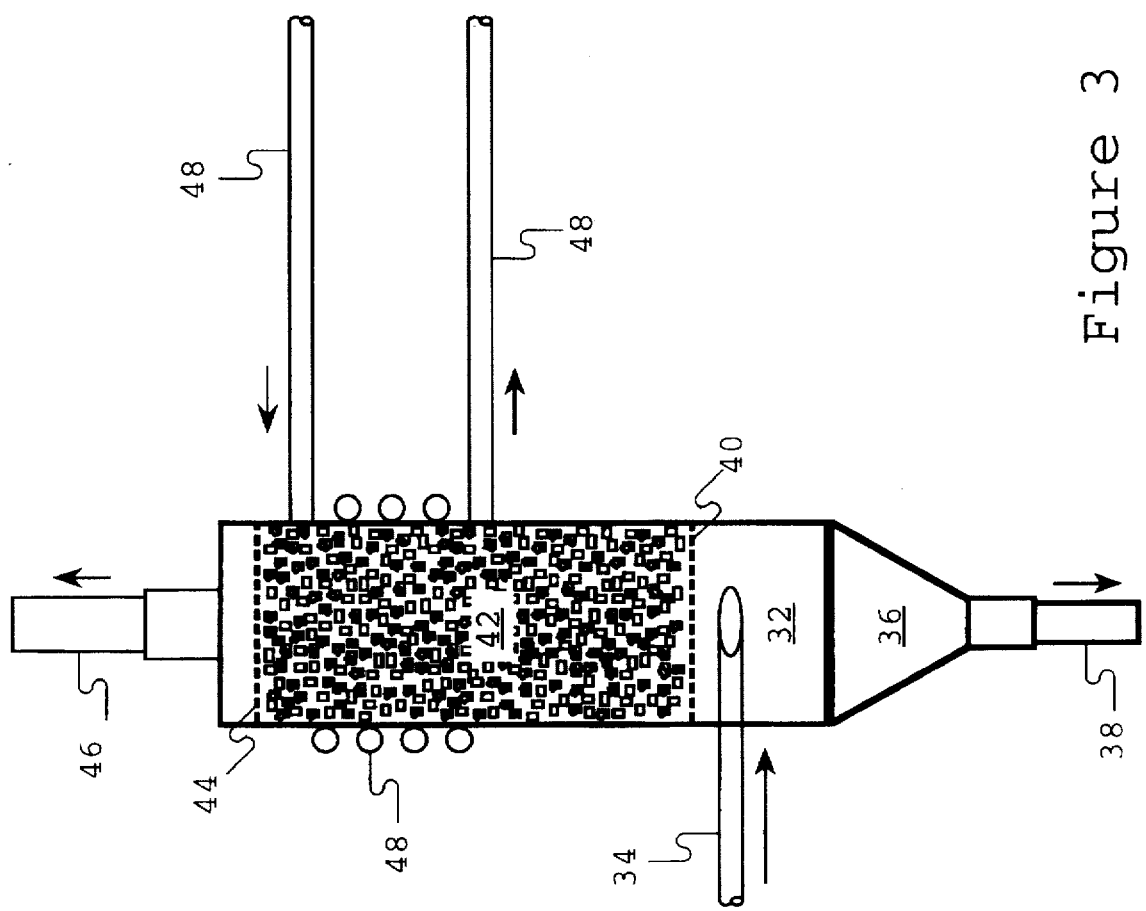
FIG. 3 is a cross-sectional view of a fractionating column and liquid-vapor separator according to the first preferred embodiment of the invention.

FIG. 3 shows a cross-sectional view of the fractionator 26 and liquid-vapor separator 20 shown in FIG. 1. A stream of vapor and liquid refrigerant is injected at high velocity into a cyclone chamber 32 through an inlet tube 34. A vortex forms in the center of the chamber, forcing the heavier liquid fraction to the outside and the lighter vapor phase closer to the core. The liquid contacts the wall and drains down a conical section 36 and out through a liquid line Meanwhile, the vapor phase moves upwards through a supporting wire screen 40 and into a packing of many small metal platelets 42. In a preferred embodiment, the packing used is "Pro-Pak protruded metal packing, 0.16" PMP, Type 316 Stainless Steel", available from Scientific Development Company, P.O. Box 795, Pennsylvania 16804. This packing is cooled by a stream of cold vapor passing through a tube 48 which is wrapped around and brazed to the outside of the column. As the vapor passes up through the cool packing, a portion of it condenses on the platelets and washes down and out the liquid line 38 at the bottom of the separator, taking with it any residual contaminants that may have been present in the vapor.

The composition of the refrigerant mixture is designed so that, at a fixed pressure, the vapor condenses to liquid over an extended temperature range (preferably ranging from the ambient temperature down to the operating temperature of the refrigerator). Consequently, as the vapor moves up through the progressively cooler packing, it continuously condenses on the metal platelets. This condensate wets the platelets and slowly drains down the column. Since the wetted platelets present a very large surface area to the ascending vapor stream, the exchange of molecules between the liquid and vapor can occur with great ease, thereby allowing equilibrium to be attained or at least nearly attained. Throughout this detailed description and the following claims the meaning of equilibrium is broadened to include approximate equilibrium. Since high-molecular-weight contaminants are more soluble in the liquid phase of the refrigerant than in the vapor phase, they are carried down the column, drip out of the bottom of the packing with the condensate, collect in the liquid-vapor separator, and are swept out with the liquid fraction through the liquid line 38. Consequently, the vapor emerging from the top of the packing is cleansed of all oil residues and contaminants. This purified refrigerant vapor then rises up through an upper screen 44 and out a vapor line 46 to the lower temperature portions of the refrigeration system.

The dimensions of the column are chosen so that the vapor velocity through the packing is low enough to allow the condensed liquid to flow down the column against the flow of the vapor rather than up. The ratio of the height to the width of the column should lie between 3:1 and 10:1 to obtain the greatest separation efficiency with the least impedance to the flow of refrigerant. The preferred embodiment uses a column 4" in height and 1" in diameter. The main parts of the column and connecting tubing are preferably made of standard copper fittings available from many plumbing or refrigeration supply houses. The parts are assembled and brazed using Sil-Fos brazing alloy with an oxy-acetylene torch. However, the column is not limited to these materials and construction methods alone. For example, stainless steel could be used, at greater expense, but would allow a greater temperature difference to exist along the fractionator because of the lower thermal conductivity of stainless steel.

A prototype of this system cooled down to 141K in 45 minutes and attained a refrigerant capacity of 30 W at 150K. It ran continuously for 1000 hours (42 days) with no signs of clogging. This method of low-temperature refrigeration, therefore, provides a simple refrigeration system that can be continuously operated at low temperatures without clogging. The fractionating column purges the refrigerant mixture of both high and low molecular weight contaminants, contains no moving parts and does not add significant volume to the system.

Figure 4:
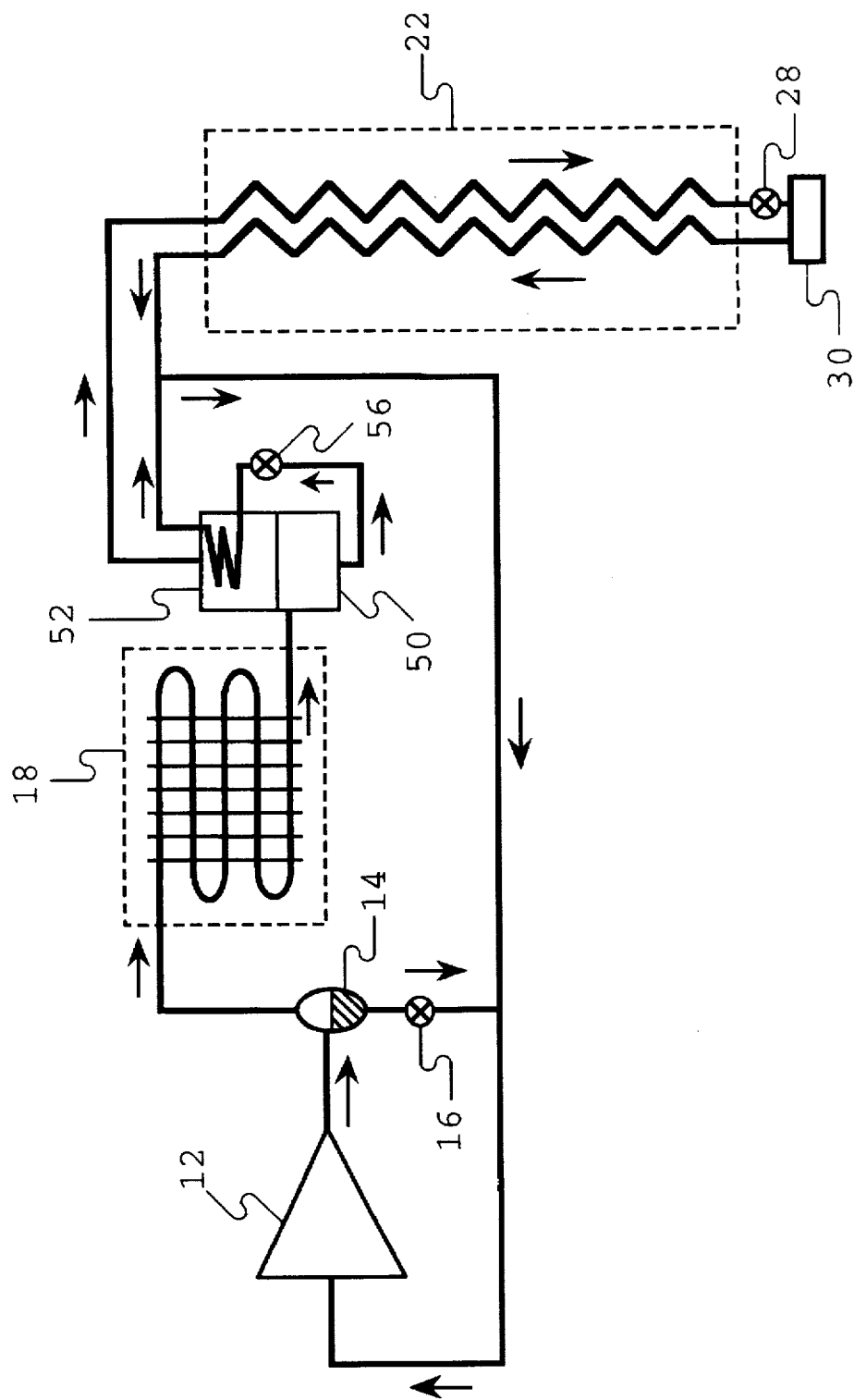
FIG. 4. is a schematic representation of a self-cleaning refrigeration system according to a second preferred embodiment of the invention.

FIG. 4 shows a second preferred embodiment of the present invention. It too implements a fractionating column which makes use of the fact that contaminants are generally more soluble in the liquid fraction than in the vapor fraction. It also uses a stream of separated liquid fraction for column cooling purposes. However, the details in which these tasks are accomplished differ and are presented here to emphasize the broad range of variability which this invention encompasses. A flow of liquid and vapor fractions from the air-cooled condenser 18 now enters an alternative liquid-vapor separator 50. The stream of condensate and contaminants flows out of 50, expanding through capillary 56, and is routed directly to a coil contained in an alternative fractionating column 52 for cooling purposes. Meanwhile, the vapor separated in the separator 50 is purified by the fractionating column 52 and proceeds as before toward the heat exchanger. Returning refrigerant from the heat exchanger in this second embodiment is routed directly to the compressor.

Figure 5:
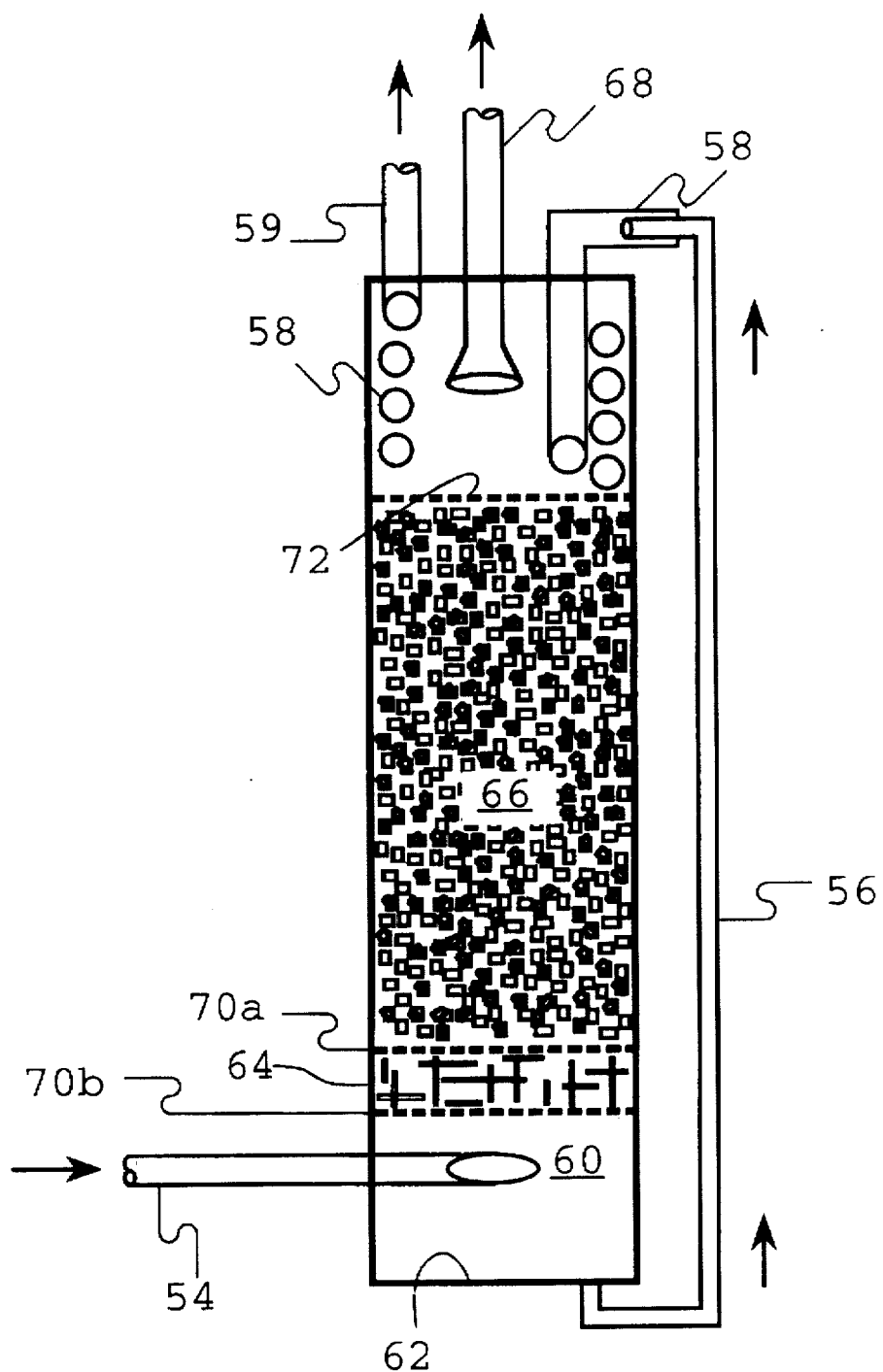
FIG. 5 is a cross-sectional view of a fractionating column and liquid-vapor separator according to the second preferred embodiment of the invention shown in FIG. 3.

FIG. 5 depicts the details of the fractionator 52 and separator 50 shown in FIG. 4. A stream of vapor and liquid refrigerant is injected at high velocity tangentially into a cyclone chamber 60 through an inlet tube 54, The liquid fraction of refrigerant and heavier droplets of contaminants are thrown against the walls of the chamber and drip down into the base of the chamber or a catchment region 62. The mixture of liquid refrigerant and contaminants collected in this region pass through a liquid line with a capillary restriction 56 and expand into a coil 58 contained in the upper portion of the fractionating column. As a result of expansion, evaporation occurs in the mixture cooling the coil and upper portion of the column. This cooling provides the temperature gradient across the fractionating column needed to remove contaminants from the vapor fraction. The mixture flows from the coil through an outlet tube 59 and returns to the compressor The vapor fraction comprising refrigerant and contaminants which are not captured in the separator proceeds up through the fractionating column. The vapor fraction first encounters a coalescing filter 64, preferably made of a wad of fiber glass, with fibers about 8 microns in diameter, sandwiched between upper and lower wire supporting screens, 70a and 70b, respectively. This filter removes the fine mist-like droplets of contaminants (in particular, fine oil droplets) which escape the separator. The remaining vapor moves up though the upper screen 70a into a region containing a packing of many small platelets 66 bounded above by an upper wire screen 72. The packing is as described in the first preferred embodiment. As the vapor moves up through the packing, some of the higher boiling point components condense covering the platelets with a film of liquid, and equilibrium between the vapor and liquid is reached as in the first preferred embodiment. The contaminants which are more soluble in the liquid phase join the condensing components and drain down the column into the catchment region 62. The purified lower-boiling point refrigerant that remains after passing through the length of the packing region and upper screen 72, exits through the center of the coil in an outlet tube 68. This high pressure vapor is then directed toward the heat exchanger 22 and follows a path as shown in FIG. 4 back to the compressor.

Some approximate dimensions of an embodiment of the fractionating column shown in FIG. 5 are as follows: 2.08" from the bottom of the catchment region 62 to the lower wire screen 70b, 0.50" between screens 70b and 70a, 2.00" from 70a to screen 72, and about 6" from the bottom of the catchment region 62 to the top of the coil 58. The coil tubing is approximately ⅛" O.D. as is the outlet tube 68. The diameter of the column is approximately 1.00".

Several important features of the second preferred embodiment follow. The coalescing filter above the separator reduces the amount of oil carried over in the oil separation stage and could be easily implemented in the first embodiment of FIG. 2. Secondly, placing the cooling coil within the top of the fractionating column makes it possible in practice to maintain a temperature difference of 10° C. to 20° C. across the column. This increases the amount of liquid refluxed down the column improving the degree with which the oil residues are removed from the outgoing vapor. Finally, the enhanced catchment region 62 acts as a surge volume. It has been found that during start up of a refrigeration system as the pressure in the sump of the compressor is reduced, foaming of oil can occur and more oil is carried over at this stage of operation than in steady state. If the cyclone separator floods as a result of this, oil can be carried up the column and entrained in the outgoing vapor, contaminating the low temperature parts of the refrigeration system. The surge volume is capable of holding excess oil during the start-up process.

Figure 6A:
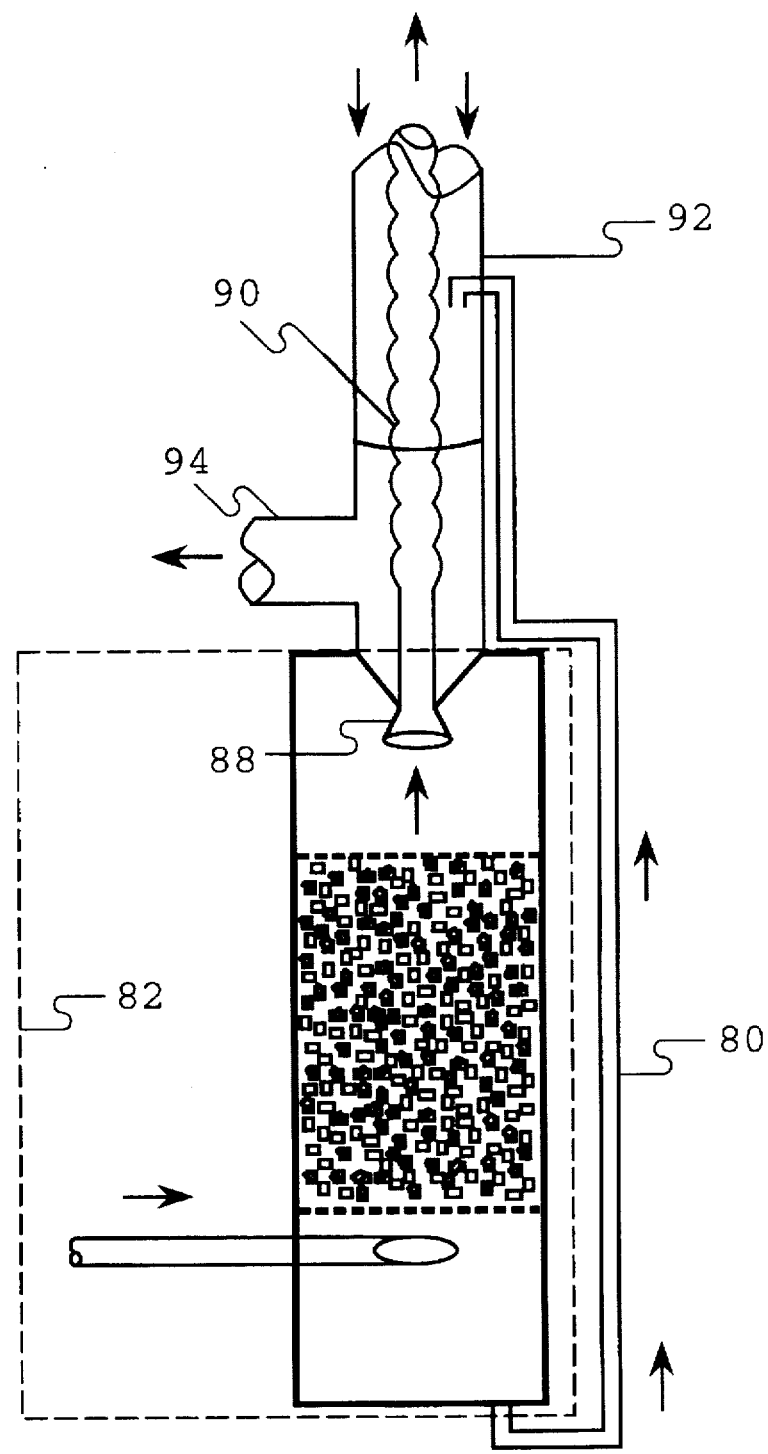
FIG. 6a is a cross-sectional view of a lower portion of an embodiment of a cooling system for a fractionating column.
Figure 6B:
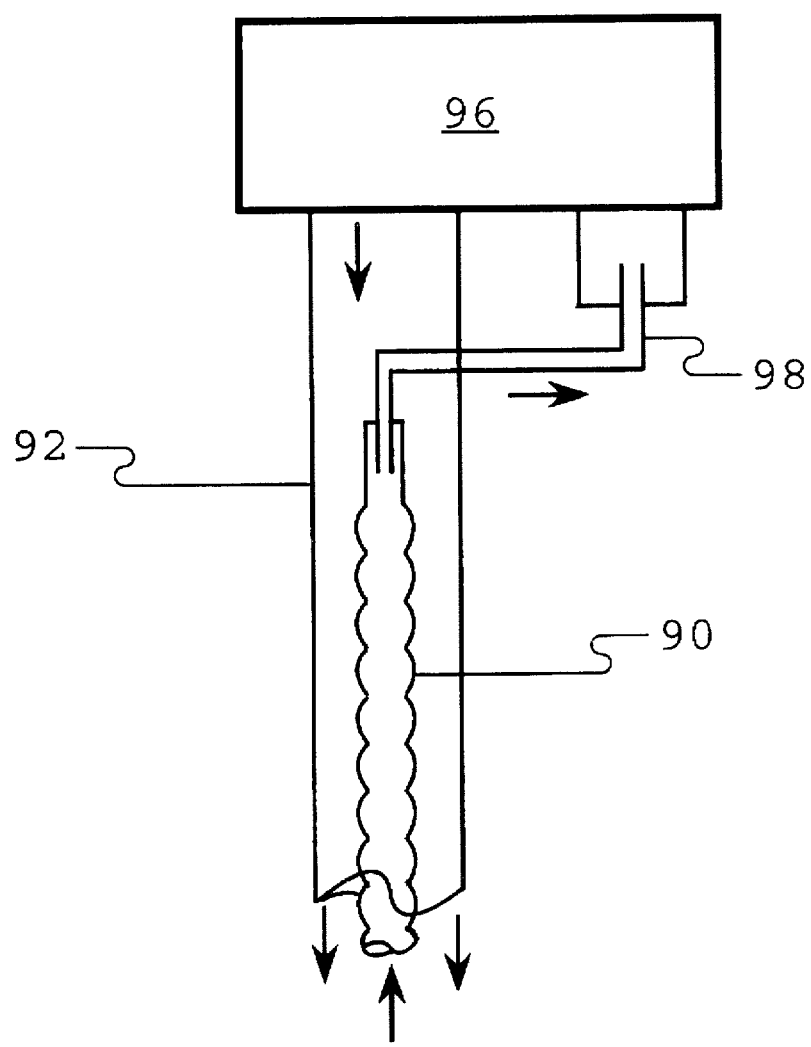
FIG. 6b is a cross-sectional view of an upper portion of an embodiment of a cooling system for a fractionating column.

FIGS. 6a, b depict a third embodiment implementing an alternative cooling use of the separated liquid fraction. Vapor fraction exits a fractionating column 82 of FIG. 6a through an outlet 88 and is guided through a twisted tube 90, preferably copper. The twisted smaller tube is contained in a larger tube 92 which is connected to the top of the column by a tee 94. The vapor fraction is guided by the twisted tube 90 towards a cold plate 96, shown in FIG. 6b, where prior to arrival, it is forced through an expansion capillary 98 to provide cooling of the plate. Cooler refrigerant returns from the cold plate through the larger tube 92 providing cooling for the vapor fraction contained in the smaller tube 90. The section of concentric tubing, 90 and 92, between the cold plate and fractionating column therefore acts as a heat exchanger and the twists in tube 90 provide substantial surface area to facilitate heat transfer.

Meanwhile, the liquid fraction exits the fractionating column 82 though a liquid line with a capillary restriction 80, is directed through a hole in the larger tube 92 just above the tee 94 and expands into the larger tube. The liquid fraction evaporates in this expansion and the resulting cold vapor is directed downwards in the tube 92 where, in combination with the returning refrigerant, it cools the tube 90 and the top of the fractionating column before exiting through the tee and proceeding to a compressor (not shown). Hence, both returning refrigerant and the liquid fraction separated out in the fractionator column are used to cool both the column and the emerging vapor fraction.

FIGS. 7a, b depict a fourth embodiment of the invention which gives, in particular, another use of the separated liquid fraction for cooling purposes. Here the vapor fraction exits the fractionating column 82 into a twisted tube 106 which is contained within a larger tube 104. The vapor cools and condenses along the tube 106 as it approaches a finger-shaped cold plate or cold finger 114. The cold finger is preferably made of brass or copper with length and width sized to match the object to be cooled. The refrigerant of tube 106 passes through a capillary 116, the resulting expansion providing the cooling for the cold finger. Cooler refrigerant returns from the cold finger within tube 104 providing cooling for the Cube 106 and the upper part of the column 82, exiting nearby at tee 102. Additional cooling of the upper portion of the column is given by a liquid fraction which exits the bottom of the column through a liquid line with capillary restriction 100. This line enters the tee 102 at the column top and follows upwards the tube 106, the line itself being cooled by the returning refrigerant in the tube 104. Shortly, the line terminates in a hook allowing the liquid fraction to expand and evaporate downward into the tube 104. Resulting cooled refrigerant provides additional cooling before exiting the tee to return towards a compressor (not shown).

Figure 8:
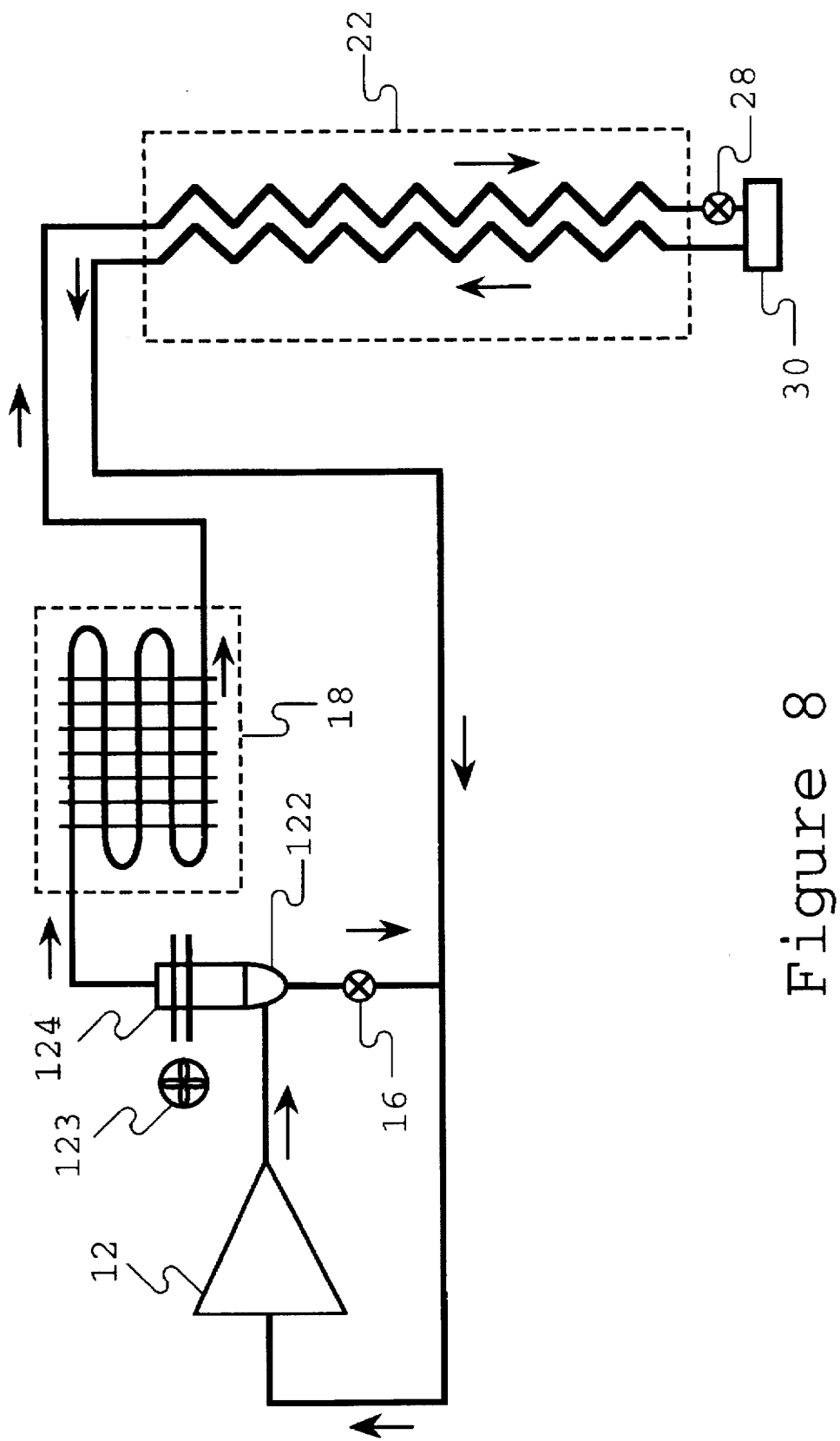
FIG. 8 is a schematic representation of a simple, inexpensive, yet efficient embodiment of the invention.
Figure 9:
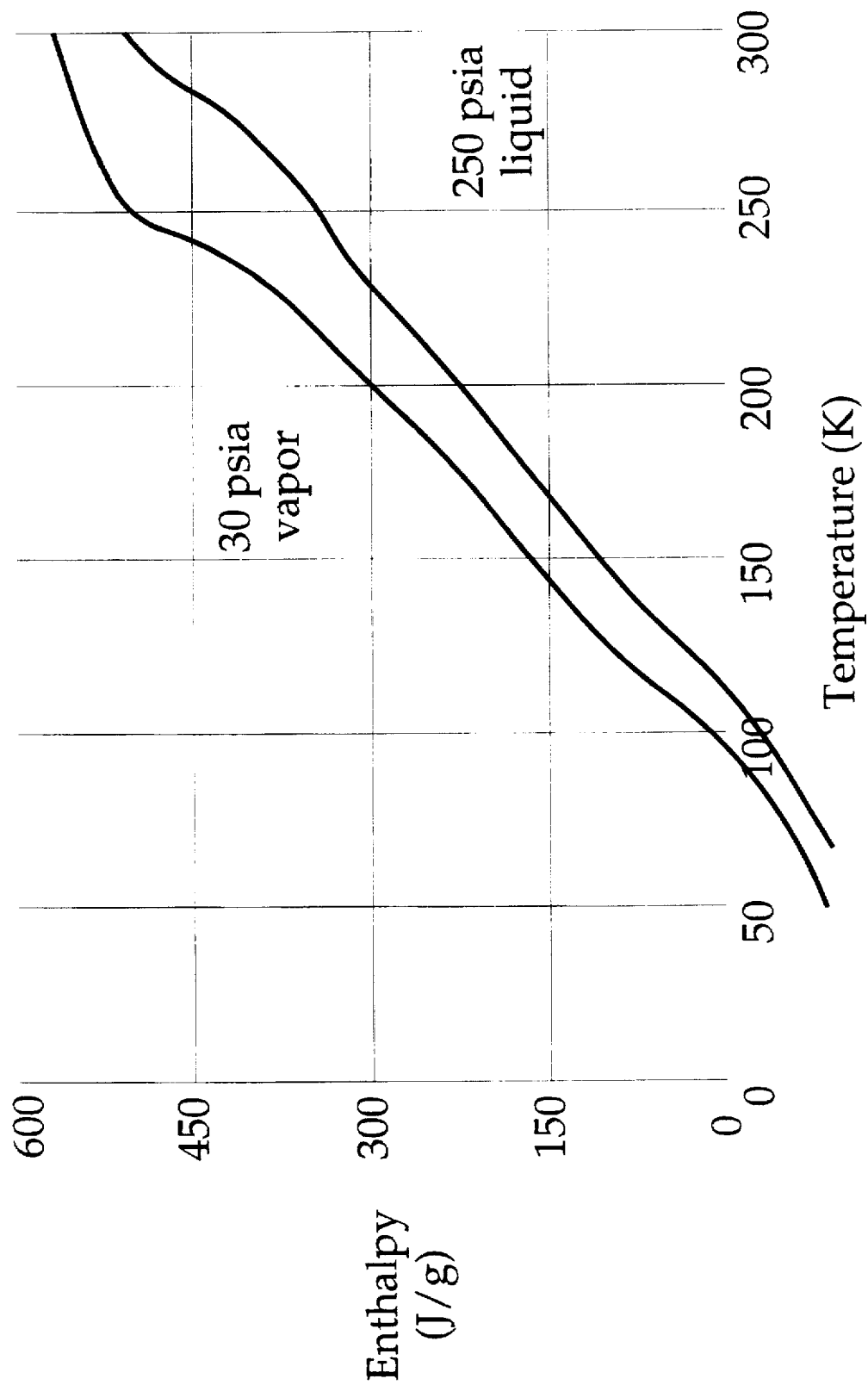
FIG. 9 is an H vs. T plot for an eight component refrigerant mixture of the simple embodiment shown in FIG. 8.

FIG. 8 illustrates a simple and inexpensive embodiment of the invention which is almost as efficient as the embodiments previously described. Here a fractionating column 124 and a liquid-vapor separator 122, commonly referred to as an oil-vapor separator, are placed immediately following the compressor 12 and prior to the condenser 18. The configuration does not need a second separator as implemented in the systems above. In addition the fractionating column has attached cooling fins cooled by a fan 123, eliminating much of the more complicated and expensive cooling mechanisms of the previous embodiments. It is noted that the configuration depicted in FIG. 8 differs from that of Longsworth in U.S. Pat. No. 5,337,572 (1994), in that Longsworth uses a standard oil-vapor separator in place of the combined fractionator-separator unit of the present invention. Circulating through the system of FIG. 8 is a refrigerant mixture, preferably, composed of 20% isobutane, 18% propane, 33% ethane, 5% methane, 8% argon, 10% nitrogen, and 6% neon. FIG. 9 shows the corresponding H vs. T graph. As in the previous embodiments other refrigerant mixtures of different composition can also be used, such as the mixtures described by Missimer, Alfeev et al, Longsworth, Little and others.

In the simple embodiment of FIG. 8 hot vapor with entrained oil-droplets exit the compressor 12 and enter the oil-vapor separator 122 attached at the base of the fractionating column 124. In the separator the oil droplets are thrown against the wall of the separator, coalesce, and flow back to the compressor via the capillary 16. In addition, as in the other embodiments, condensate drips down through an above packing and combines with the separated oil. It is emphasized that since this liquid mixture contains refrigerant, unlike prior art separators in Longsworth's configuration, the expansion process through capillary 16 results in significant cooling and the returning mixture cools the motor of the compressor and hence improves its efficiency. While the liquid is draining from the separator, the separated vapor proceeds from the separator up through a packing in the fractionating column where contaminants are further removed by the condensate dripping down the column. The purified vapor which exits the top of the column 124, enters the condenser 18, and proceeds towards the remaining components, the heat exchanger 22, the capillary 28, the cold plate 30 and the compressor 12 respectively.

Figure 10:
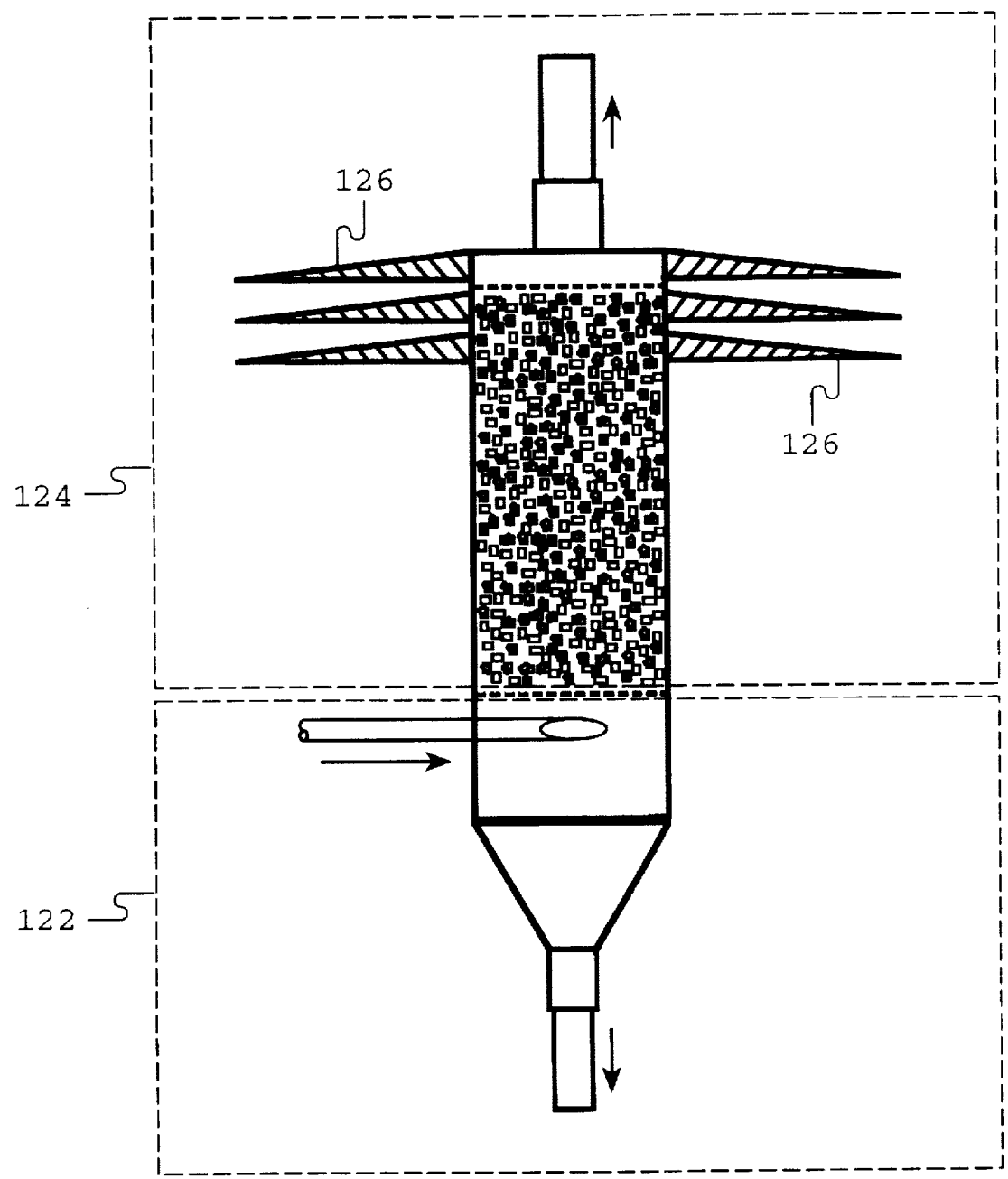
FIG. 10 is a cross-sectional view of a fractionator and separator used in the simple embodiment of FIG. 8.

A particularly simple embodiment of the fractionator 124 and separator 122 is depicted in FIG. 10. This embodiment differs from the others primarily in the manner in which the column is cooled. The fractionator 124 is cooled by passing air, or alternatively another cooling fluid such as water, across the cooling fins 126, rather than some more complicated plumbing internal to the system. Obviously variations on the column include more complicated internal cooling such as that suggested by FIG. 5. The column and separator of FIG. 5 could be inserted into the configuration of FIG. 8, replacing 122 and 124, where the outlet tube 59 is routed back to the compressor 12 of FIG. 8 through capillary 16 and the outlet tube 68 connects directly to the condenser 18 also of FIG. 8. As in all the above embodiments, additional variations include adding a coalescing filter between the fractionating column and the separator as depicted in FIG. 5 and described above, and/or adding a surge volume in the form of an enhanced catchment region at the base of the separator also as described above.

In spite of the great simplifications and reduced expense, this mode of the invention remains nearly as efficient as the systems of FIGS. 1 and 4. A prototype was charged with a mixture of 20% isobutane, 18% propane, 33% ethane, 5% methane, 8% argon, 10% nitrogen, and 6% neon at a pressure of 75 psi. After start up the pressure rose to 320 psi and reached a temperature of 90K in 120 minutes. The system was then run continuously for 1000 hours without any clogging.

RAMIFICATION AND SCOPE

Although the above description contains many specifics, it is intended merely to illustrate how the disclosed method may be implemented. Many variations are possible in the composition of the refrigerant and in the materials and components used in the system. This method can also be used with refrigeration systems having different designs. For example, although the above systems use a single fractionating column at the warmer end of a single-stage cycle, it is obvious that additional fractionating columns can be included at lower temperature stages in a more complicated multi-stage cycle. These additional fractionating columns would be introduced where liquid-vapor separators of the conventional type would normally be used, as is described by Kleemenko and Missimer. These additional columns are needed for continuous operation at still lower temperatures, where one of the higher-boiling-point components of the mixture tends to precipitate out from solution and clog the system. In addition, as Missimer has pointed out, complete vapor-liquid separation is neither necessary nor beneficial. By allowing all the liquid contained in the separator of FIG. 1 to pass through the capillary restrictor 24 along with some additional vapor, no build-up of liquid can occur in the cyclone separator 20 nor flooding of the fractionator 26.

In addition to metal platelets, a variety of different packing materials can be used in the fractionating column, such as glass beads, glass spirals, porcelain pieces, or ceramic chips. Such materials are available from scientific supply houses for the packing of distillation columns. Although the refrigerant mixture used in the preferred embodiment has specific percentages of various components, these percentages may be varied by as much as 3% without altering the significant attributes of the mixture. In addition, this method may be used with other multi-component refrigerant mixtures having similar properties. In view of these and other possible variations, the scope of the invention should not be determined by the details of the above description, but by the following claims and their legal equivalents.

We claim:

1. A method of closed-cycle low-temperature refrigeration comprising:
    compressing a multi-component refrigerant in a compressor to form a high-pressure refrigerant stream containing contaminants;
    separating a vapor fraction from the refrigerant stream;
    filtering droplets of contaminants from the vapor fraction;
    condensing a portion of the vapor fraction to form a condensate;
    placing the vapor fraction and the condensate in phase-equilibrium with each other;
    dissolving into the condensate residual contaminants present in the vapor fraction while the vapor fraction and the condensate are in phase-equilibrium;
    removing the filtered droplets and the condensate containing the residual contaminants from the vapor fraction to produce a purified vapor stream; and
    passing the purified vapor stream through low-temperature stages of a refrigeration cycle and thereafter back to the compressor.

2. The method of claim 1 wherein the multi-component refrigerant condenses, at a fixed pressure, over a temperature range extending from the temperature of the vapor fraction down to the temperature of the lowest-temperature stage.

3. The method of claim 1 wherein following the separating step, but prior to the condensing step, the separated vapor fraction is passed through a coalescing filter, whereby removing fine mist-like droplets of contaminants from the vapor fraction.

4. The method of claim 1 wherein the step of placing the vapor fraction and the condensate in phase-equilibrium is performed by presenting a large surface area to the condensate and vapor.

5. The method of claim 1 wherein the removing step comprises allowing the condensate to drip down through a cooled packing material under the influence of gravity while the purified vapor stream rises up.

6. The method of claim 1 wherein the removing step comprises passing the condensate through an expansion capillary.

7. The method of claim 1 wherein the contaminants have a molecular weight significantly larger than a molecular weight of the refrigerant.

8. The method of claim 1 wherein the refrigerant comprises propane, n-butane, argon, nitrogen, R14, R134a, R23 and R123.

9. The method of claim 1 wherein the refrigerant comprises isobutane, propane, ethane, methane, argon, nitrogen, and neon.

10. The method of claim 1 wherein the low-temperature stages of the refrigeration cycle reach temperatures below −100°C.

11. The method of claim 1 wherein the condensing step is performed by passing the vapor fraction through a cooled packing material.

12. The method of claim 1 wherein the packing material comprises metal platelets.

13. A device for removing contaminants from a refrigerant, the device comprising:

a vessel having a first opening through which the refrigerant enters the vessel, a second opening through which a condensate of the refrigerant exits the vessel, and a third opening through which a vapor fraction of the refrigerant exits the vessel;

a coalescing filter positioned within the vessel between the first opening and the third opening for collecting droplets of contaminants;

a packing material positioned within the vessel between the coalescing filter and the third opening, wherein the packing material comprises metal platelets for condensing a portion of the refrigerant to produce the condensate of the refrigerant, wherein the condensate contains dissolved contaminants;

a cooling means positioned in thermal contact with the vessel for cooling the vessel below a temperature of the refrigerant; and a collecting means positioned between the first opening and the second opening for collecting the condensate.

14. The device of claim 13 wherein the collecting means comprises a catchment region of the vessel.

15. The device of claim 13 wherein the cooling means comprises a coiled tube positioned within the vessel between the packing material and the third opening.

16. The device of claim 13 wherein the cooling means comprises a capillary expansion tube attached to the second opening.

17. The device of claim 13 wherein the cooling means comprises cooling fins positioned outside the vessel.

18. A method for removing contaminants from a refrigerant, the method comprising:

passing the refrigerant into an entrance of a cooled vessel;

providing within the vessel above the entrance a packing material which presents a surface area to the refrigerant;

condensing on the surface area of the packing material a portion of the refrigerant to create a condensate and a vapor fraction, wherein the contaminants are dissolved in the condensate;

passing the vapor fraction upward through the packing material and subsequently through a first vessel exit;

collecting the condensate below the packing material;

passing the condensate through a second vessel exit and subsequently through an expansion capillary to create a cooled condensate; and placing the cooled condensate in thermal contact with the vessel, whereby the contaminants are extracted from the refrigerant and washed out with the condensate.

19. The method of claim 18 further comprising providing a coalescing filter positioned within the vessel above the entrance but below the packing material, and passing the vapor fraction upward through the coalescing filter.

20. The method of claim 18 wherein the packing material comprises metal platelets.

21. The method of claim 18 wherein the step of placing the cooled condensate in thermal contact with the vessel comprises passing the cooled condensate through a coiled tube positioned within the vessel above the packing material.

22. The method of claim 18 wherein the step of placing the cooled condensate in thermal contact with the vessel comprises passing the cooled condensate through a tube positioned outside of the vessel.

23. The method of claim 18 further comprising providing the vessel with cooling fins attached to the exterior of the vessel.

* * * * *